United States Patent

Timm et al.

(10) Patent No.: US 6,827,278 B1
(45) Date of Patent: Dec. 7, 2004

(54) DATA CARRIER

(75) Inventors: Volker Timm, Pinneberg (DE); Ralf Malzahn, Seevetal (DE); Wolfgang Eber, Graz (AT); Dominik Berger, Graz (AT); Jozef Laurentius Wilhelmus Kessels, Eindhoven (NL); Torsten Kramer, Hamburg (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/555,306

(22) PCT Filed: Sep. 28, 1999

(86) PCT No.: PCT/EP99/07459

§ 371 (c)(1),
(2), (4) Date: Oct. 6, 2000

(87) PCT Pub. No.: WO00/19353

PCT Pub. Date: Apr. 6, 2000

(30) Foreign Application Priority Data

Sep. 30, 1998 (DE) .......................................... 198 45 022

(51) Int. Cl.[7] .............................................. G06K 19/06
(52) U.S. Cl. ........................ 235/492; 235/380; 235/486; 361/737
(58) Field of Search ................................ 235/375, 380, 235/486, 492, 382, 487; 361/737; 711/100; 710/61; 712/220, 223

(56) References Cited

U.S. PATENT DOCUMENTS 5,182,442 A * 1/1993 Takahira ..................... 235/436
5,432,328 A * 7/1995 Yamaguchi .................. 235/449
5,604,342 A * 2/1997 Fujioka ....................... 235/435
5,619,529 A * 4/1997 Fujioka ....................... 375/219
6,027,029 A * 2/2000 Kim ............................ 235/492
6,036,100 A * 3/2000 Asami ......................... 235/492
6,059,191 A * 5/2000 Sedlak et al. ................ 235/492
6,125,452 A * 9/2000 Kuriyama .................... 713/600
6,157,966 A * 12/2000 Montgomery et al. ......... 710/8
6,164,550 A * 12/2000 Pitsch ......................... 235/492
6,199,764 B1 * 3/2001 Tsai ............................ 235/492
6,317,825 B1 * 11/2001 Commercial ................. 708/490
6,513,719 B1 * 2/2003 Imura .......................... 235/492
6,609,098 B1 * 8/2003 DeMarcken ................... 705/6
6,661,215 B2 * 12/2003 Asami ......................... 323/281

FOREIGN PATENT DOCUMENTS

FR          WO 99/23550 A1 * 5/1999

* cited by examiner

Primary Examiner—Michael G. Lee
Assistant Examiner—Ahshik Kim
(74) Attorney, Agent, or Firm—Kevin Simons

(57) ABSTRACT

A data carrier is disclosed. The data carrier includes a data processing unit and at least one contactless interface via which the data processing unit can be coupled to a read/write apparatus in order to exchange data signals and to take up electrical energy for the operation of the data processing unit; the data processing unit is constructed at least mainly while using at least substantially asynchronously operating logic components (asynchronous logic). The data carrier according to the invention, such as a chip card, makes optimum use of the energy applied thereto and is at the same time protected against the tapping of the signal processing steps to be executed therein.

10 Claims, 2 Drawing Sheets

DATA CARRIER

The invention relates to a data carrier, notably a chip card.

U.S. Pat. No. 5,406,064 discloses an IC card which can operate at option in an operating mode or in an energy-saving mode. The operations in the operating mode are executed only in conformity with a command signal which is supplied by a predetermined, external device, and in the energy-saving mode the associated operations can be terminated after the reception of a predetermined enable signal, thus enabling a return to the operating mode. The IC card includes an information processing circuit and an enable signal generating circuit for delivering the enable signal to the information processing circuit at the instant at which the command signal is received from the external device. The information processing circuit executes the process corresponding to the command signal received in the operating mode and subsequently triggers the IC card to switch over to the energy-saving mode. A portable terminal, enabling the operation of the IC card in the energy-saving mode, includes a clock signal generating circuit which is arranged to generate a clock signal of a frequency which is lower than the nominal value of the clock frequency of the IC card. An interface is arranged for the transfer of data to the IC card, the data transfer rate being proportional to a ratio of the low frequency of the clock signal from the clock signal generating circuit to the nominal value of the clock frequency of the IC card.

It has been found that such an arrangement does not enable optimum use of the energy applied to the IC card.

It is an object of the invention to construct a data carrier in such a manner that optimum use can be made of the energy applied to such a data carrier.

This object is achieved according to the invention by means of a data carrier, notably a chip card, which includes a data processing unit and at least one contactless interface via which the data processing unit can be coupled to a read/write apparatus in order to exchange data signals and to take up electrical energy for the operation of the data processing unit, the data processing unit being constructed at least mainly of at least substantially asynchronously operating logic components (asynchronous logic).

Generally speaking, a simpler construction and simpler operation of a data processing unit on a data carrier are achieved in that all or substantially all logic components of the data processing unit are controlled in synchronism by one clock signal. As is known, the execution in time of operations for the processing of data signals can thus be very accurately predetermined.

In the data carrier according to the invention, however, the data processing unit is constructed in such a manner that at least the majority of the logic components therein, if not all components, are arranged as asynchronously operating logic components. Such asynchronously operating logic components are also referred to as asynchronous logic. They are distinct from synchronously operating logic components in that they are no longer controlled by a preferably centrally generated clock signal, but operate rather like under "handshake" control. Such logic components are activated only in response to a request signal. Once they have executed their operation and their result is available, they signal so by supplying a "finished" message. The co-operation of asynchronously operating logic components takes place by the propagation of, for example the "finished" message from a first logic component as a request signal to the next logic component in the series of operating steps to be performed for the data signals. A predetermined time frame, like in the case of a predetermined clock signal, no longer occurs; the period of time required for the relevant processing of data signal results exclusively from the combination of the processing times in the individual logic components to be successively traversed. It has been found that the processing times in the logic components are strongly dependent on the supply voltage applied thereto. If a fixed clock signal were given, a decreasing supply voltage could give rise to the problem that errors occur in the processing of the data signals due to processing times which exceed the predetermined clock periods. Using asynchronous logic, however, the processing time for the data signals increases; consequently, errors cannot occur.

This is advantageous notably when in the present case the data carrier receives only a very small amount of electrical energy via the contactless interface. The overall period of time required for the processing of the data signals then becomes longer and longer, but the exceeding of a predetermined clock period cannot cause errors in the processing of the data signals. Because of the automatic adaptation of the processing times of the data signal processing in the asynchronously operating logic components, the energy required by the data processing unit is always exactly adapted to the electrical energy supplied via the contactless interface. Consequently, the data processing unit will not be forced into a mode of operation in which its instantaneous energy consumption exceeds, be it perhaps only briefly, the highest energy that can be supplied via the contactless interface. Conversely, the construction of the data carrier according to the invention offers the possibility of completing individual signal processing steps, or a set of signal processing steps, within a given period of time and with a minimum energy consumption. Should the supplied electrical energy decrease, the signal processing in the asynchronously operating logic components automatically slows down and, conversely, it can be deliberately adjusted, by reduction of the energy supply, to a predetermined value which is accompanied by a saving of energy.

This aspect can be used to particularly good advantage when two parts of the data processing unit have to execute a different number of signal processing steps within a given period of time. For the smaller number of signal processing steps a lower signal processing speed can then be selected, so that in this part of the data processing unit electrical energy can be saved in comparison with the other part of the data processing unit.

However, the construction of the data processing unit using asynchronous logic also offers the possibility of quasi-synchronous operation via central timing of the request signals, for example by means of a synchronization clock. To this end, synchronization of the command execution is imposed at event limits which are provided, for example by a timer and correspond at least approximately to command limits generated in the case of synchronously operating logic components, so that outside the command limits the data processing unit behaves as if it were operating synchronously. This mode of operation is particularly useful for fault finding in the programs or program sections to be executed by the data processing unit. It can be deactivated for the intended operation of the data carrier, for example by means of a switch.

The fully asynchronous mode of operation of the data processing unit according to the invention imposes different execution times of unpredictable length for the individual data signals to be processed. Consequently, unauthorized access to the data carrier, aimed at finding out the execution times for the individual signal processing steps performed on the data signals, is inhibited in practice.

The fully asynchronous mode of operation of the data carrier according to the invention, moreover, inhibits unauthorized accessing of data signals via differential power analysis. Such a method of attack utilizes signal waveforms which arise at the contactless interface due to the operation of the data processing unit. It aims to extract information as regards the processed data signals by correlating different signal patterns produced for different data signals. Because a strictly synchronous, clock-controlled execution of operations is required for such a method, the use of asynchronous logic in a mode of operation which is not synchronized by a clock signal prevents such an attack from becoming successful.

The contactless interface and the data processing unit in a preferred embodiment of the data carrier according to the invention are coupled via an asynchronous transmission/receiving circuit which is included in the data processing unit. Such asynchronous transmission/receiving circuits are generally known as UART. They enable the reception of a data signal of a predetermined clock frequency from the read/write apparatus and the propagation of this data signal, asynchronously with respect to the reception, to the data processing unit and, conversely, asynchronous reception of such a data signal from the data processing unit and its synchronous propagation to the read/write apparatus.

Preferably, in the data carrier according to the invention time interleaved operation takes place of individual stages within at least the data processing unit. Such time interleaved operation can also advantageously take place within the contactless interface. It is thus achieved that only few stages consuming electrical energy are in operation at a time within the data carrier, so that an as uniform as possible, low energy consumption of the data carrier can be achieved via the contactless interface, without inadmissibly high power peaks occurring. This benefits the transfer characteristic of the contactless interface for the electrical energy.

The contactless interface for the electrical energy supply for the operation of the data processing unit in a further embodiment of the data carrier according to the invention has the function of an at least substantially ideal current source. This means that the contactless interface delivers an at least essentially constant current in order to supply the data processing unit with electrical energy, said current being, at least in wide ranges, at least substantially independent of the electrical voltage on a terminal via which said current is applied from the contactless interface to the data processing unit. As a result of this construction, such a control function is realized for the data carrier according to the invention that, in the case of a high energy consumption by the data processing unit, said supply voltage, with which the current is supplied, automatically decreases. As the supply voltage decreases, however, the processing speed for the data signals in the data processing unit also decreases. This means that as the supply voltage is lower, the processing times become longer and hence also the signal delay which is imposed on the data signals in the data processing unit due to these processing times. Thus, as the data processing unit becomes slower, its activity decreases, i.e. the number of data processing operations per unit of time decreases. However, its energy consumption then also decreases, with the result that the current consumption decreases, thus enabling an increase of the supply voltage. Self-control of the performance of the data processing unit is thus very simply and effectively realized in conformity with the supply of electrical energy via the contactless interface.

The drawing shows an embodiment according to the invention which will be described in detail hereinafter.

Figure 1:
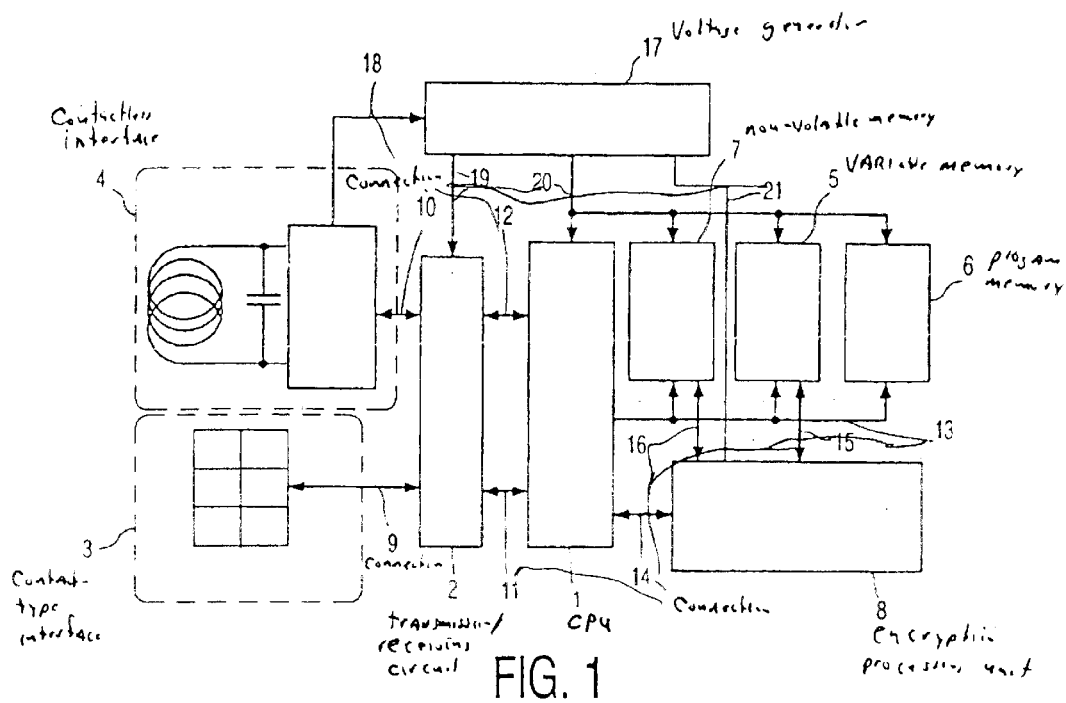
FIG. 1 shows an embodiment of a data carrier according to the invention.

FIG. 1 shows a block diagram of a data carrier according to the invention, preferably being a chip card. This data carrier includes a plurality of so-called modules. FIG. 1 shows as such:

a central processing unit 1, also referred to as CPU,
a universal asynchronous transmission/receiving circuit 2, also referred to as a UART,
a contact-type interface 3,
a contactless interface 4,
a variable memory 5, preferably constructed as a RAM,
a program memory 6, preferably constructed as a ROM,
a non-volatile memory 7, notably in the form of an EEPROM, and
an encryption processing unit, also referred to as cryptocoprocessor and denoted by the reference numeral 8 in FIG. 1.

The contact-type interface 3 in the data carrier shown in FIG. 1 is preferably constructed in conformity with ISO standard 7816 whereas the contactless interface 4 is preferably constructed in conformity with ISO standard 14443. Both interfaces 3, 4 are connected, via a respective connection 9 and 10 of the transmission/receiving circuit 2 and, via this circuit and connections 11 and 12, to the central processing unit 1. Via these connections, the data signals derived from a write/read apparatus by the interfaces 3 and 4 are applied, via the transmission/receiving circuit 2, to the central arithmetic unit 1 and, conversely, are applied therefrom, via the transmission/reception circuit 2, to the interfaces 3, 4 in order to be applied to the write/read apparatus. Generally speaking, only one of the interfaces 3, 4 will be active at a time. Via this interface the total amount of electrical energy required is, therefore, applied to the data carrier. The larger the data processing unit of the data carrier, consisting of the central processing unit 1, the transmission/receiving circuit 2, the encryption processing unit 8 and the memories 5, 6, 7, the higher their electrical energy requirements will be; this energy has to be supplied via the respective active interface 3 or 4. A power limit is then quickly reached, notably for the contactless interface 4, i.e. the data processing unit will have to operate with very small supply currents which are of an order of magnitude of 1 mA in a practical embodiment. The supply power resulting from this supply current and the supply voltage supplied by the interface, i.e. the available electrical energy, must be sufficient to power all elements of the data processing unit during operation.

In conformity with the cited ISO standards, the permissible current for power supply in one of the contacts of the contact-type interface 3 is limited to 50 mA. This current limit generally does not constitute an important limitation for data processing units with contemporary logic components for data carriers of the kind according to the invention. For the use of a contactless interface in conformity with said standard while a transmission distance of approximately 10 cm exists between the data carrier and the write/read apparatus, a supply current of approximately from 1 to 2 mA can be realized in conformity with said standard. Such a small supply current, however, may be too small for a data processing unit having a conventional construction. The powering of all logic components of the data processing unit at all times, i.e. the powering of the modules 1, 2, 5, 6, 7, 8 in FIG. 1, therefore, is no longer automatically ensured. This may lead to severe limitations of the function of the data carrier.

This problem is circumvented because the construction according to the invention, notably of the central processing unit 1, the transmission/receiving circuit 2 and the encryption processing unit 8 in the data processing unit of the data carrier according to the invention, utilizes at least substantially asynchronously operating logic components (asynchronous logic). As opposed to synchronously operating logic components (synchronous logic), operating in conformity with a rigid predetermined clock signal and their current consumption thus being fixed by this clock signal and the program for the processing of the data signal to be executed in conformity with this clock signal, a data processing unit with asynchronous logic automatically adapts itself to the available supply of electrical energy. Preferably, the memories 5, 6, 7 are also constructed in such a manner that they operate as asynchronous logic. It is thus ensured, without affecting the precision of the processing of the data signals, that the data processing unit will at no instant require more energy than can be delivered via the relevant active interface. Moreover, the data carrier according to the invention is given the opportunity to make optimum use of the electrical energy made available. This means that the data processing unit should always take up exactly as much electrical energy as can be supplied via the relevant active interface, so that no oversupply of electrical energy should occur at any instant. The data carrier according to the invention optimally satisfies this requirement by way of the described control function.

The described function of the data carrier according to the invention, achieved with optimum energy use according to the invention, implies that all logic components in all modules 1, 2, 5, 6, 7, 8 of the data processing unit operate with a processing speed for the data signals which is as high as required for the application of the data carrier, and that in doing so they consume only the minimum amount of electrical energy required for this operation. A particular advantage of the construction of the data carrier according to the invention as shown in FIG. 1 becomes manifest as the optimum configuration of the simultaneous operation of several of the modules of the data processing unit shown in FIG. 1. This will be described in detail hereinafter on the basis of an example of the operation of the central processing unit 1 and the encryption processing unit 8.

The central processing unit 1 is connected to the memories 5, 6, 7, via connections 13, for the program-controlled execution of supplied data signals. The encryption processing unit 8 is connected to the central processing unit 1 via a connection 14; it is connected to the variable memory 5 via a connection 15 and to the non-volatile memory 7 via a connection 16. In the present embodiment no connection is provided between the encryption processing unit 8 and the program memory 6, because this memory is intended to store only program parts required in the central processing unit 1.

In order to carry out a calculation for the encryption or decryption of data signals, during contemporary program runs the encryption processing unit 8 is continuously engaged in arithmetic operations for a period of time of an order of magnitude of a few milliseconds, whereas during this period the central processing unit 1 need execute only few operations which are essentially limited to the loading of given data from the memories 5, 6, 7. If it carries out the relevant arithmetic operations at the same speed as the encryption processing unit 8, the central processing unit 1 need not execute operations for a very large part of said period of time. Nevertheless, in the case of clock-bound operation of the central processing unit 1 a high supply power would have to be made available in order to deal with the power peaks which inevitably occur in this mode of operation.

In accordance with the invention, however, during said period of time the processing speed in the central processing unit 1 can be reduced to such an extent that the central processing unit 1 continuously executes its assigned operations during at least substantially the entire period of time. This is simply achieved in accordance with the invention in that the supplied energy, i.e. the current supplied for energy supply and hence the supply voltage, are reduced until the low processing speed still required is reached. The energy consumption of the central processing unit 1 is thus significantly reduced. Not only the mean power consumption is significantly reduced, but also power peaks, if any. A significantly lower loss power occurs in the central processing unit 1. The saved electrical energy, conversely, can serve for increasing as much as possible, in conformity with the supply of electrical energy, the processing speed for all encryption or decryption operations in the encryption processing unit 8. An arrangement for realizing a distribution of the electrical energy between the various modules which is optimum in this respect will be described in detail hereinafter.

Figure 2:
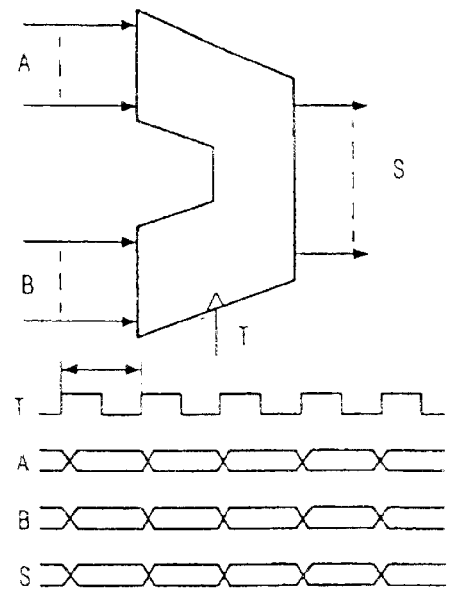
FIG. 2 shows an example of a synchronously operating logic component.
Figure 3:
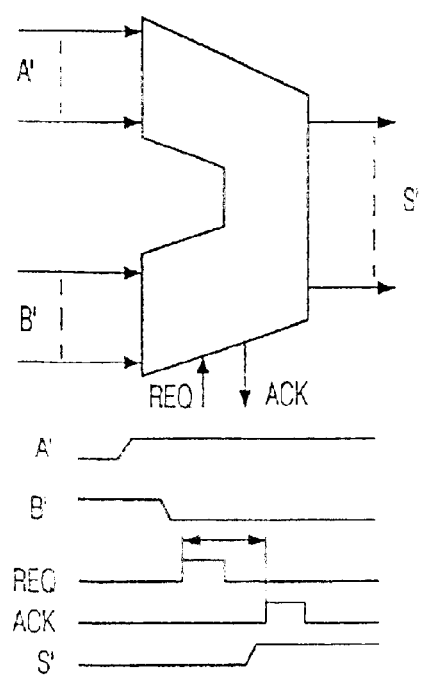
FIG. 3 shows an example of an asynchronously operating logic component (asynchronous logic)

In order to explain the differences between synchronously and asynchronously operating logic components FIG. 2 shows an example of a synchronously operating logic component. This component serves to perform a logic combination of a first operand A and a second operand B and to output the combination result S. In order to control this synchronously operating logic component, a clock signal T is applied via a relevant input. FIG. 2 shows, by way of example, variations in time of the clock signal T, the operands A and B as well as the combination result S. At the instant of the active edge of the clock signal T, in this case being the ascending edge, the two operands A, B are combined in the logic component shown and the combination result S is applied to the output. During this synchronous mode of operation the temporal behavior of the clock signal T determines the operating properties of the logic component. It notably fixes the consumption of electrical energy in respect of its variation in time and its magnitude. For the sake of comparison FIG. 3 shows an asynchronously operating driven logic component. This component receives the operands A' and B' and the combination result S' is obtained by logic combination. The operation for forming the combination result S', however, is performed only in response to the reception of a request signal REQ on a predetermined input. The operands A' and B', therefore, can be applied at random instants until the occurrence of the request signal REQ. Operation in synchronism with other logic components, combined by a common clock signal, is not envisaged and not required either.

When the operation has been completed by the asynchronously operating logic component and the combination result S' is available, an appropriate message is issued by way of a signal ACK which is autonomously generated by the logic component and is supplied via an associated lead so as to represent a "finished" message. The combination result S' can be derived from the associated leads after output of the "finished" message ACK, but not before that.

FIG. 3 also shows the variation in time of an example of the described signals.

Logic components of this kind and circuit arrangements built therefrom operate without a common clock signal and solely on the basis of and in conformity with the signal propagation times. Several of such asynchronously operating logic components co-operate in a so-called handshake mode. A "finished" message of a first logic component in a chain of logic components, whereby a data signal is to be processed in a logic sequence or whereby several data signals are to be combined, controls the formation of a request signal for a subsequent logic component. The operation of the subsequent logic component, therefore, is initiated only in response to the arrival of the combination results of the preceding logic component (components). When the signal propagation time in the logic components increases due to the decreasing of the supply voltage applied thereto, the overall signal processing automatically becomes slower, without giving rise to problems in the logic execution of the operations to be carried out. The processing speed can thus be readily controlled via the adjustment of the supply voltage.

An extensive data processing unit or an extensive module of such a data processing unit, comprising a large number of logic components, may also be segmented into smaller sub-modules with a comprehensible asynchronous mode of operation. An asynchronous mode of operation of the handshake type can then take place within the individual sub-modules; the sub-modules can contact one another in the same way.

Figure 4:
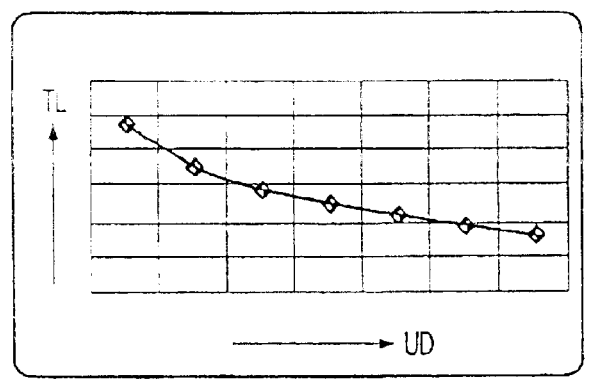
FIG. 4 illustrates the dependency of the processing speed on the supply voltage for a data signal in a CMOS logic component.

FIG. 4 illustrates diagrammatically a non-linear dependency between the supply voltage UD of an asynchronously operating logic component and the propagation time TL occurring therein for the signal processing. The relationship, shown by way of example, notably applies to CMOS logic components. Customarily, for CMOS logic components the relationship shown in FIG. 4 is a quadratic function.

The described mode of operation of the handshake type is preferably used not only for the logic components in the central processing unit 1 and the encryption processing unit 8, but also for the control of the memories 5, 6, 7.

The modules of the data carrier shown in FIG. 1 can thus simply operate in a number of modes of operation which differ in respect of energy consumption and hence in respect of processing speed. This may involve a stepped adjustment of the energy consumption by way of a stepped adjustment of the supply voltage for individual modules or the overall data processing unit as well as a stepless adaptation of the energy consumption by way of a stepless adjustment of the supply voltage which can be realized, for example by way of the described control mechanism. Both cases utilize the property of asynchronous logic that a matching signal processing speed is adjusted for each value of the supply voltage.

For the control of the described modes of operation the data carrier of FIG. 1 includes a supply voltage generator 17 which receives, via a connection 18, the energy intended to power the entire data processing unit from the contactless interface 4. Via further connections 19, 20, 21, the energy for power supply is distributed to the transmission/receiving circuit 2, the central processing unit 1 with the memories 5, 6, 7 and the encryption processing unit 8. In order to adjust different signal processing speeds, supply currents or supply voltages of different magnitude can then be supplied via the connections 19, 20, 21. To this end, the supply voltage generator 17 may be arranged so as to be controllable by the central processing unit 1.

Figure 5:
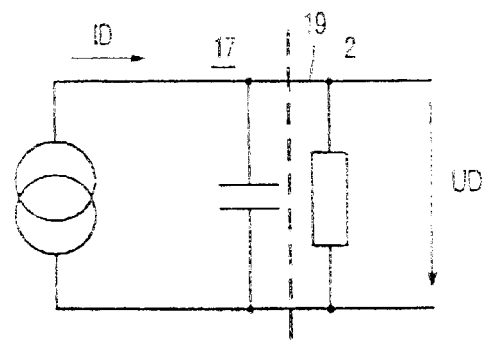
FIG. 5 shows an equivalent diagram illustrating the characteristic of the supply of the data carrier of FIG. 1 with electrical energy.

FIG. 5 shows a coarse circuit diagram of the supply voltage generator 17 in relation to each of the connections 19, 20 and 21 to the connected modules 2 and 1, 5, 6, 7 and 8 of the data processing unit. The Figure shows, by way of example, the co-operation between the supply voltage generator 17 and the transmission/receiving circuit 2 via the connection 19. The equivalent diagram of the supply voltage generator 17 includes an at least substantially ideal current source which delivers a supply current ID. To this current source the transmission/receiving circuit 2 represents an essentially ohmic load. A buffer capacitor serves to smooth fluctuations of the supply voltage UD arising across the transmission/receiving circuit 2. The buffer capacitor serves to represent the parasitic capacitance of the arrangement represented by the equivalent diagram.

The modules fed by the supply voltage generator 17, including the transmission/receiving circuit 2, carry a supply current ID only if they are active, i.e. if signal processing takes place therein. Thus, they are to be represented by a temporally variable ohmic resistance. Generally speaking, however, the current source is also temporally variable. When the activity of the powered module or the powered modules increases because a larger number of logic operations is to be carried out during the intended processing of the data signals, the resultant supply voltage UD decreases, because the module or the modules take up a larger current and hence constitutes a lower resistance. As the supply voltage UD is smaller, the signal propagation time in the modules or their logic components increases. Consequently, the modules become slower, their activity decreases and hence also their energy consumption. However, this leads to an increase of the supply voltage UD, because the modules now represent a higher ohmic resistance. The supply voltage generator thus constructed is, therefore, a self-controlling type.

The supply voltage generator 17 in FIG. 1 forms a plurality of such self-controlling circuits. Each supply current ID, fixed in the individual modules to be powered in conformity with operations to be carried out, can adapt the processing speeds of the individual modules (possibly in a program-controlled manner) so that the available energy is distributed in such a manner that the overall period of time required matches the number of predetermined signal processing steps in the various powered modules. Optimum use of the energy is thus achieved in combination with an as high as possible signal processing speed.

The transmission/receiving circuit 2 in the data carrier according to the invention has the function of governing the flow of data signals between the synchronously operating read/write apparatus and the interfaces 3, 4 on the one side and the asynchronous logic of the data carrier on the other side. Like in the example shown in FIG. 1, the transmission/receiving circuit 2 may be constructed as a separate module, but preferably as a separate electronic circuit component of the data carrier. The function of the transmission/receiving circuit, notably for the synchronization of the asynchronously generated data signals for output to the read/write apparatus, however, can also be performed by the central processing unit 1. To this end, given arithmetic operations may be envisaged for the central processing unit 1. The choice of the relevant embodiment is governed essentially by the required signal processing speed in the interfaces 3, 4 on the one side and the central processing unit 1 on the other side. In the case of high signal processing speeds, a separate circuit implementation for the transmission/receiving circuit 2 is to be preferred over an implementation by program steps in the central processing unit. The limit preferably lies between 50 and 100 kbaud, measured in a serial data signal. In each case automatic synchronization is achieved between the data carrier and the write/read apparatus.

Because of the construction of the data processing unit by means of asynchronously operating logic components, an at least substantially statistical, temporal distribution of the durations of the execution times of the signal processing steps is achieved and also an at least substantially statistical distribution of the instants at which the individual processing steps occur. This randomness of the execution times, produced by the asynchronous logic, on the one hand offers time interleaved activation of the individual logic components, sub-modules or modules so that the operation of these individual elements takes place successively and hence is statistically uniformly distributed so that an as low as possible, uniform energy consumption is realized. A second advantage over a simultaneous mode of operation of said logic components, sub-modules or modules consists in that the current consumption of the data carrier is not an unambiguous, reproducible image of the signal processing steps performed therein. This constitutes a major advantage in that it makes it impossible to carry out so-called "Differential Power Analysis". The tapping of the processing runs in the data carrier according to the invention while using such a method is thus effectively precluded.

It is to be noted that for a supply current ID which is governed by the capability of the contactless interface 4 the individual, successively operating elements of the data carrier, i.e. the logic components, sub-modules or modules, can be arranged in such a manner that in the worst case their individual current consumption is not larger than the supply current ID available. When the individual elements then operate successively, the current consumption of the data carrier cannot rise beyond said supply current due to superposition of the current consumption of all of said elements.

What is claimed is:

1. A data carrier comprising:

a data processing unit having a plurality of asynchronously operating logic components;

at least one contactless interface configured to enable coupling to a read/write apparatus in order to receive electrical energy for operation of the data processing unit; and a supply voltage generator configured to receive the electrical energy from the contactless interface and to distribute the received electrical energy to the plurality of asynchronous operating logic components, the supply voltage generator configured to distribute different magnitudes of energy to different asynchronous operating logic components to adjust speed of operation of the asynchronous operating logic component, wherein selected asynchronously operating logic components are activated in response to a request signal in a coordinated manner using the received electrical energy, and wherein the supply voltage generator adjusts the magnitude of the energy distributed to each asynchronous operating logic component such that operations performed by the plurality of asynchronous operating logic components are completed within required time periods and the combined energy consumed by all the asynchronous operating logic components does not exceed the received electrical energy.

2. The data carrier as claimed in claim 1, wherein the contactless interface and the data processing unit are coupled to one another via an asynchronous transmission/receiving circuit which is included in the data processing unit.

3. The data carrier as claimed in claim 1, wherein individual stages within at least the data processing unit operate in a time interleaved manner.

4. The data carrier as claimed in claim 1, wherein the supply voltage generator of the data processing unit has the function of an at least substantially ideal current source such that the supply voltage generator automatically adjusts the magnitude of the voltage distributed to each asynchronous operating logic components to control speed of operation.

5. The data carrier as claimed in claim 1, wherein the coordinate manner includes selected asynchronously operating logic components providing a finished message after executing its operation, the finished message operable as a request to another selected asynchronously operating logic component.

6. The data carrier as claimed in claim 1, wherein the coordinated manner includes the propagation of a request message from a first selected asynchronously operating logic component to a second asynchronously operating logic component in a series of operating steps.

7. The data carrier as claimed in claim 1, wherein the data carrier is configured to process selected asynchronously operating logic components within a predetermined time with a predetermined minimum of energy consumption.

8. The data carrier of claim 1, wherein the supply voltage generator adjusts a voltage distributed to each asynchronous operating logic component such that operations performed by the plurality of asynchronous operating logic components are completed within required time periods.

9. The data carrier of claim 8, wherein in the supply voltage generator adjusts the voltage distributed to each asynchronous operating logic component in steps under control of a processor.

10. The data carrier of claim 8, wherein the supply voltage generator comprises a circuit for each of the plurality of asynchronous operating logic components that automatically adjusts each voltage in response to current consumed by each asynchronous operating logic component.

* * * * *